Aug. 16, 1955      F. W. JOBE      2,715,352
RETINOSCOPE
Filed April 5, 1954
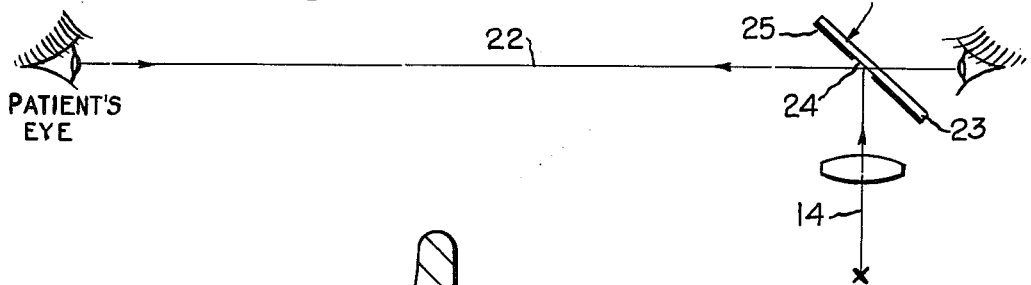
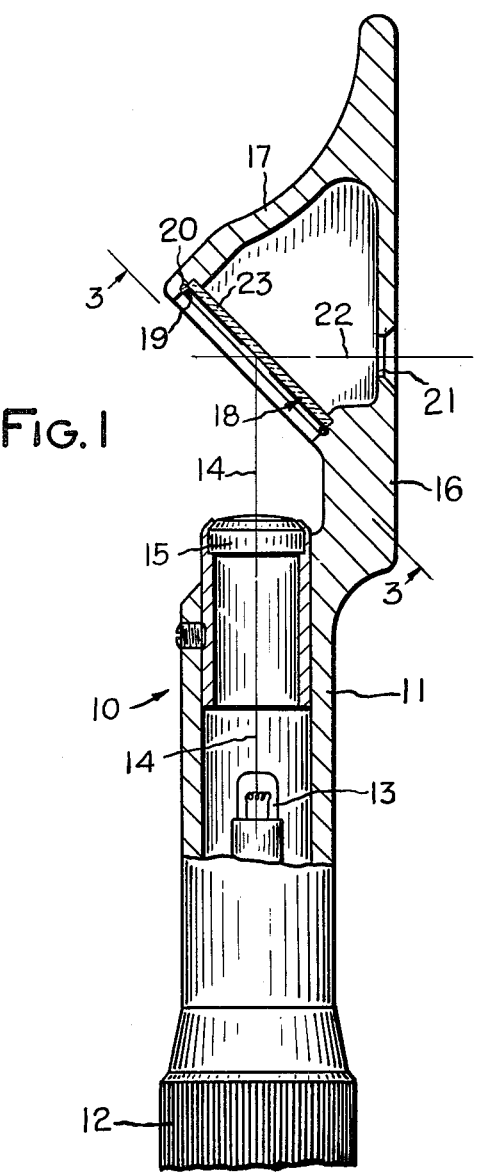
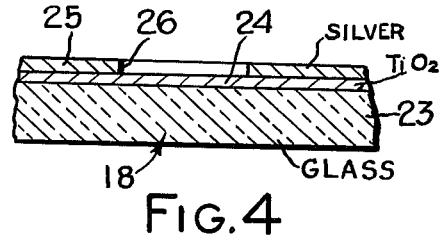
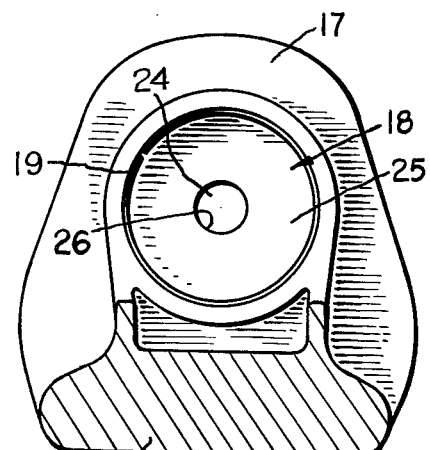
INVENTOR.
FREDERICK W. JOBE
ATTORNEYS

United States Patent Office 2,715,352
Patented Aug. 16, 1955

2,715,352

RETINOSCOPE

Frederick W. Jobe, Brighton, N. Y., assignor to Bausch & Lomb Optical Company, Rochester, N. Y., a corporation of New York Application April 5, 1954, Serial No. 420,877

3 Claims. (Cl. 88—20)

This invention relates to improvements in diagnostic instruments and more particularly it has reference to improved mirrors for retinoscopes.

When examining a patient's eye with some retinoscopes of current design, a concentric ring of illumination is directed opon the retina of the eye by an opaquely silvered mirror having a portion of the silvering removed so as to provide a clear central aperture through which a refractionist examines the patient's eye. With this construction, only the illumination reflected from the central glass surface at the aperture is projected upon a patient's retina at the point of neutralization. Since the glass at the apertured portion of the mirror is practically non-reflective at this point, the intensity of reflected illumination is very low. The point of neutralization is a position in retinoscopy where practically a point image of a portion of the patient's retina is formed at the sighting aperture of the retinoscope. Some prior devices employ polished glass surfaces over the aperture at the center of the mirror for reflecting light from the source into the eye of the patient. However, the amount of light reflected is still practically negligible. Other prior devices make use of transparent metal coated mirrors which have increased the amount of illumination ultimately available for observation at the point of neutralization, but such illumination is still highly insufficient for accurate determination of errors of refraction.

Furthermore, at the start of a retinoscopic examination, before the point of neutralization is reached, an intense amount of illumination is desirable. This starting illumination is afforded in some prior devices by reflection from the outer concentric ring of opaquely silvered mirror. However, insufficient illumination is available at the point of neutralization due to the low reflectivity-transmissivity ratio of the central portion of the mirror. Other prior devices use transparent metal coated mirrors which furnish more illumination at the point of neutralization, but fail to furnish sufficient illumination at the start of the examination due to the relatively low amount of reflection from the overall surface of the mirror.

Therefore, it is an object of my invention to provide a retinoscope having means for substantially increasing the amount of illumination ultimately available for observation both at the start of an examination and after the point of neutralization is reached. A further object of this invention is to provide a retinoscope having an improved reflecting system which will not produce shadows and insufficiently illuminated areas.

Further objects and advantages reside in the details of construction, and arrangement and combination of parts, as will be apparent by reference to the following description and accompanying drawing in which:

Fig. 1 is a side view of a retinoscope embodying my invention, showing some parts broken away and in section, Fig. 2 is a schematic view showing my improved retinoscope in use, Fig. 3 is a sectional view taken on the line 3—3 of Fig. 1, and Fig. 4 is an enlarged sectional view through the central portion of my improved mirror.

A preferred form of the present invention is shown in the drawings wherein similar reference characters designate corresponding parts throughout the several views. A retinoscope 10, shown in Fig. 1, comprises a base 11 which is suitably held on a handle or support 12 (fragmentarily shown). Housed in the base 11 is a light source 13 which is optically aligned along an axis 14 with a condenser lens 15. A plate 16, upstanding from the base 11, has a top member 17 extending forwardly and downwardly into supporting relation for a reflecting mirror 18 which is held at an angle to the axis 14 between the member 17 and plate 16 by an expansion ring 19 which is seated in a recess 20 around the edge of the mirror 18. The plate 16 has a slight aperture 21 through which a refractionist can sight along the sight line 22 through the mirror 18 into a patient's eye.

A preferred form of my improved mirror 18 comprises a transparent blank 23, preferably made of glass, having a transparent reflecting film 24 deposited on one surface thereof. An opaque reflecting coating 25, of silver, for example, is superimposed on the surface of the transparent film 24 and has a sight aperture 26 through the coating. Said sight aperture 26, optically aligned with the light source 13 along the axis 14, is also aligned with the sight opening 21 along the sight line 22. The blank 23 can be made of any material, either transparent or opaque, as long as it has a transparent section aligned with the sight aperture 26.

The transparent reflecting film 24 is most effective when formed of titanium dioxide. Of the known transparent reflecting film materials, titanium dioxide has the highest ratio of reflectivity to transmissivity for a given standard thickness of film. A titanium dioxide film deposited by the thermal evaporation method one-quarter wavelength of green light thick will transmit within the range of 55% to 65% of the light rays striking it and will reflect within the range of 35% to 45% of the remaining light rays striking it.

When examining an eye with known prior retinoscopes, insufficient illumination is available at the point of neutralization due to a lack of sufficient reflected light from the center of the mirror. This lack of illumination is overcome in my new retinoscope by the relatively high reflectivity of the titanium dioxide film at the center of the mirror. For example, taking a value of 100% as the amount of light emitted from a source 13 to the mirror 18, approximately 40% of the light striking the titanium dioxide film at the center of the mirror will be reflected into the eye of a patient and 58% will be transmitted through the film and dissipated. Assuming that the patient's eye reflects all 40% of the illumination striking it from the mirror back toward the eye of the observer, the titanium dioxide film at the center of the mirror will transmit 58% of the light striking it and will reflect the remaining 40% into space. Therefore, the transmitted 58% of the originally reflected 40% or 23% of the original illumination striking the center of the mirror will ultimately reach the eye of the observer. At the same time, almost 100% of the illumination striking the outer opaque silvered portion 25 of the mirror 18 will be reflected into the eye of the patient. If we assume that 100% of the light will be reflected from the eye of the patient back toward the eye of the observer, 58% of this illumination will be transmitted through the transparent film 24 of titanium dioxide at the center of the mirror. The observer, therefore, sees an outer broad ring well illuminated by approximately 58% of the originally emitted light and a central disc of substantially good illumination of approximately 23% of the originally emitted light.

For comparison purposes, in those prior devices using polished glass mirrors, only 8% of the illumination reaching the mirror from the source is reflected toward the eye of a patient, while 92% of said illumination is transmitted and dispersed. If all 8% of the illumination is reflected back from the eye of the patient, 92% of the 8% will be transmitted by the mirror to the observer. Therefore, 92% of 8% or approximately 7.5% of the original illumination will reach the observer at the center of the mirror. Comparing this prior art 7.5% reaching the observer with the 23% reaching the observer with the titanium dioxide film, it becomes apparent that over three times more illumination is now available at the center of the illuminated area using my new retinoscope. This increased illumination results in more accurate and dependable diagnosis.

Some prior devices have the advantage of an intense concentration of illumination at the beginning of an examination due to the concentric ring of opaque silvered mirror, but have practically no illumination at the point of neutralization due to the poorly reflecting central portion of the mirror. Other prior devices having a whole surface coated with transparent metal film have the advantage of some illumination at the point of neutralization, but have the disadvantage of insufficient illumination at the start of an examination. With my improved mirror, I have both the advantage of intense illumination at the beginning of the examination and the advantage of good illumination at the point of neutralization.

Although titanium dioxide is the only film shown and described and is the preferred form of my invention, the use of zinc sulfide, tin oxide, and the like, may be used for the transparent film, but only at the expense of decreasing the amount of illumination ultimately reaching the observer's eye. Titanium dioxide is the best known film with the property of not dispersing uselessly any substantial portion of incident light rays. For example, assume 100% as the amount of illumination reaching the mirror from a light source, with titanium dioxide 40% will be reflected and 58% will be transmitted with only 2% being wasted. Platinum films, on the other hand, reflect 30%, transmit 30% and disperse uselessly or waste 40%, so that with a transparent film of platinum ultimately only 9% of the original illumination will reach the observer.

While the preferred form of the invention has been shown and described, it is to be understood that various changes may be made in the details of construction and in the combination and arrangement of the several parts within the scope of the claims, without departing from the spirit of the invention.

What is claimed as new is:

1. A retinoscope comprising a base having an upstanding plate with a sight opening therethrough, a light source in the base, and a reflecting means mounted on said plate in optical alignment with the light source and inclined with respect to the rays from said source, said reflecting means comprising a base having a transparent central portion, a transparent reflecting film of titanium dioxide on one surface of said last-named base, and an opaque reflective coating superimposed on the transparent film and having a sight aperture therethrough in alignment with the sight opening in the plate, whereby the eye of a patient may be illuminated for examination.

2. A retinoscope comprising a base having an upstanding plate with a sight opening therethrough, a light source in the base, and a reflecting means mounted on said plate in optical alignment with the light source and inclined with respect to the rays from said source, said reflecting means comprising a base having a transparent central portion, a transparent reflecting film of titanium dioxide on one surface of said last-named base one-quarter wavelength of green light thick and reflecting within the range of 35–45% of all incident illumination and transmitting within the range of 55% to 65% of said illumination, and an opaque reflective coating of silver superimposed on a portion of the transparent film and having a sight aperture therethrough in alignment with the sight opening in the plate whereby the eye of a patient may be illuminated for examination.

3. In a retinoscope the combination of a base, reflector means supported on the base, said reflector means comprising a transparent blank, a transparent reflecting film of titanium dioxide one-quarter wavelength of green light thick on one surface of said transparent blank, said titanium dioxide film reflecting approximately within the range of 35% to 45% of all incident illumination and transmitting substantially all the remaining illumination, and an opaque reflecting coating superimposed on the transparent reflecting film and having a sight aperture therethrough, said opaque coating reflecting substantially all incident illumination.

References Cited in the file of this patent

UNITED STATES PATENTS

| | | |
|---|---|---|
| 1,664,953 | Tillyer | Apr. 3, 1928 |
| 2,631,498 | Barkley | Mar. 17, 1953 |